United States Patent [19]

Waugh

[11] Patent Number: 5,084,972
[45] Date of Patent: Feb. 4, 1992

[54] DEVICE FOR COLLECTING DUST FROM A PORTABLE CIRCULAR SAW

[76] Inventor: Ricky L. Waugh, 292 Buddy La., Camby, Ind. 46113

[21] Appl. No.: 646,070
[22] Filed: Jan. 25, 1991
[51] Int. Cl.⁵ .............................................. B26D 7/18
[52] U.S. Cl. ..................................... 30/124; 30/391; 83/100; 83/168; 144/252 R
[58] Field of Search ............... 83/100, 168; 30/124, 30/391; 51/273; 144/252 R

[56] References Cited

U.S. PATENT DOCUMENTS

| | | | |
|---|---|---|---|
| 1,552,553 | 9/1975 | Georgia | 144/252 R |
| 2,229,598 | 1/1941 | Nash | 51/273 X |
| 2,562,396 | 7/1951 | Schutz | 51/273 X |
| 3,123,111 | 3/1964 | Mattson | 144/252 R X |
| 3,662,796 | 5/1972 | Batistelli | 30/124 X |
| 4,466,187 | 8/1984 | Morimoto | 30/124 |
| 4,675,999 | 6/1987 | Ito et al. | 30/124 |

*Primary Examiner*—Frank T. Yost
*Assistant Examiner*—Kenneth E. Peterson
*Attorney, Agent, or Firm*—David B. Quick

[57] ABSTRACT

Disclosed is a saw dust collector which can be selectively attached to or removed from the fixed blade guard of a portable circular saw which has front and rear vacuum apertures located near the front and rear blade guard openings which are in fluid communication with a single vacuum source.

17 Claims, 4 Drawing Sheets

DEVICE FOR COLLECTING DUST FROM A PORTABLE CIRCULAR SAW

BACKGROUND OF THE INVENTION

1. Field of the Invention

This invention relates to collecting dust produced from a portable circular saw and more particularly to a device for collecting dust which can be readily attached to and removed from existing portable circular saws with little or no modification to the saw.

2. Background of Prior Art

Portable circular saws create large amounts of sawdust, especially when used to cut concrete, masonry, wood and like materials. When working outside, this dust generally does not create a large problem. However, when working inside, and especially during remodeling work, the sawdust fills the air creating safety hazards and clean-up problems. The problems created by airborne dust, which can be generated by tools other than portable circular saws, have been addressed by other patents. This inventor is aware of the following patents which attempt to reduce the amount of airborne dust created by power tools:

| Patent No. | Inventor | Issue Date |
|---|---|---|
| 4,414,743 | Pioch, et al. | 11/15/83 |
| 4,241,505 | Bodycomb, Jr., et al. | 12/30/80 |
| 4,192,104 | Patenaude | 3/11/80 |
| 4,063,478 | Stuy | 12/20/77 |
| 2 506 208 (France) | Mugnier, J. | 11/26/82 |

Stuy and the French patent to Mugnier both appear to disclose dust collecting systems for circular table saws. Neither of the devices disclosed in these patents appear to be readily adaptable to portable hand-held circular saws. Patenaude discloses a vacuum unit for removing dust from a rotating, abrading component. Patenaude's dust shroud is internally subdivided to provide for vacuum chambers on opposite sides of the abrading component in a manner somewhat similar to the design disclosed in this patent application. However, Patenaude is not readily adaptable to portable circular saws and is not designed and arranged to be attached and removed from existing portable circular saws without modification.

The only prior art that the inventor is aware of which relates directly to portable circular saws is illustrated in Bodycomb Jr. and Pioch, et al. Pioch, et al discloses a dust collection system for a portable circular saw wherein a specially designed fixed upper blade guard is designed and arranged to be connected to a vacuum source for collection of sawdust generated during use. Pioch, et al is not readily adaptable to attachment to existing circular saws and, should the user desire the benefits of Pioch, et al, it would be necessary for them to replace their existing circular saws. Bodycomb Jr., et al discloses a dust shroud for a portable circular saw which would require the replacement of the upper blade guard and also the movable lower blade guard. The design disclosed in Bodycomb Jr., et al creates a problem with using the portable circular saw for cutting into standing construction materials as is often required in remodeling. Also, the device in Bodycomb Jr., et al is not readily adaptable for attachment to an existing circular saw without modification of the saw.

BRIEF SUMMARY OF THE INVENTION

The invention herein comprises an attachment for an existing portable circular saw with a fixed upper blade guard having a front blade guard opening and a rear blade guard opening. The device has a housing with a lower surface and a downwardly extending flange extending below one side of the lower surface to define a receiving channel designed and arranged to receive the fixed upper blade guard with the housing extending beyond the rear terminus of the fixed upper blade guard which defines the rear upper blade guard opening. There is a vacuum aperture in the housing extending through the lower surface located near the rear blade guard opening when the fixed upper blade guard is received within the receiving channel. A vacuum source connection means for connection to a vacuum source is attached to the lower surface in fluid communication with the rear vacuum aperture. A vacuum aperture is also located near the front blade guard opening and is in fluid communication with the vacuum source. Removable fixed upper blade guard attachment means are attached to the housing to allow for removable attachment of the housing to the fixed upper blade guard of a portable circular saw.

It is an object of the present invention to provide a device for collecting dust from a portable circular saw which allows for attachment of the device to existing saws without modifying the existing saw.

It is another object of this invention to provide a device for collecting dust from a portable circular saw which can be attached to and removed from the portable circular saw as needed.

Yet another object of the present invention is to provide a device for collecting dust generated by portable circular saws which can be attached to an existing circular saw and will not inhibit the use of the circular saw for cutting into standing construction materials in a remodeling situation.

Related objects and advantages of the present invention will be apparent from the following description.

DESCRIPTION OF THE PREFERRED EMBODIMENT

Figure 1:
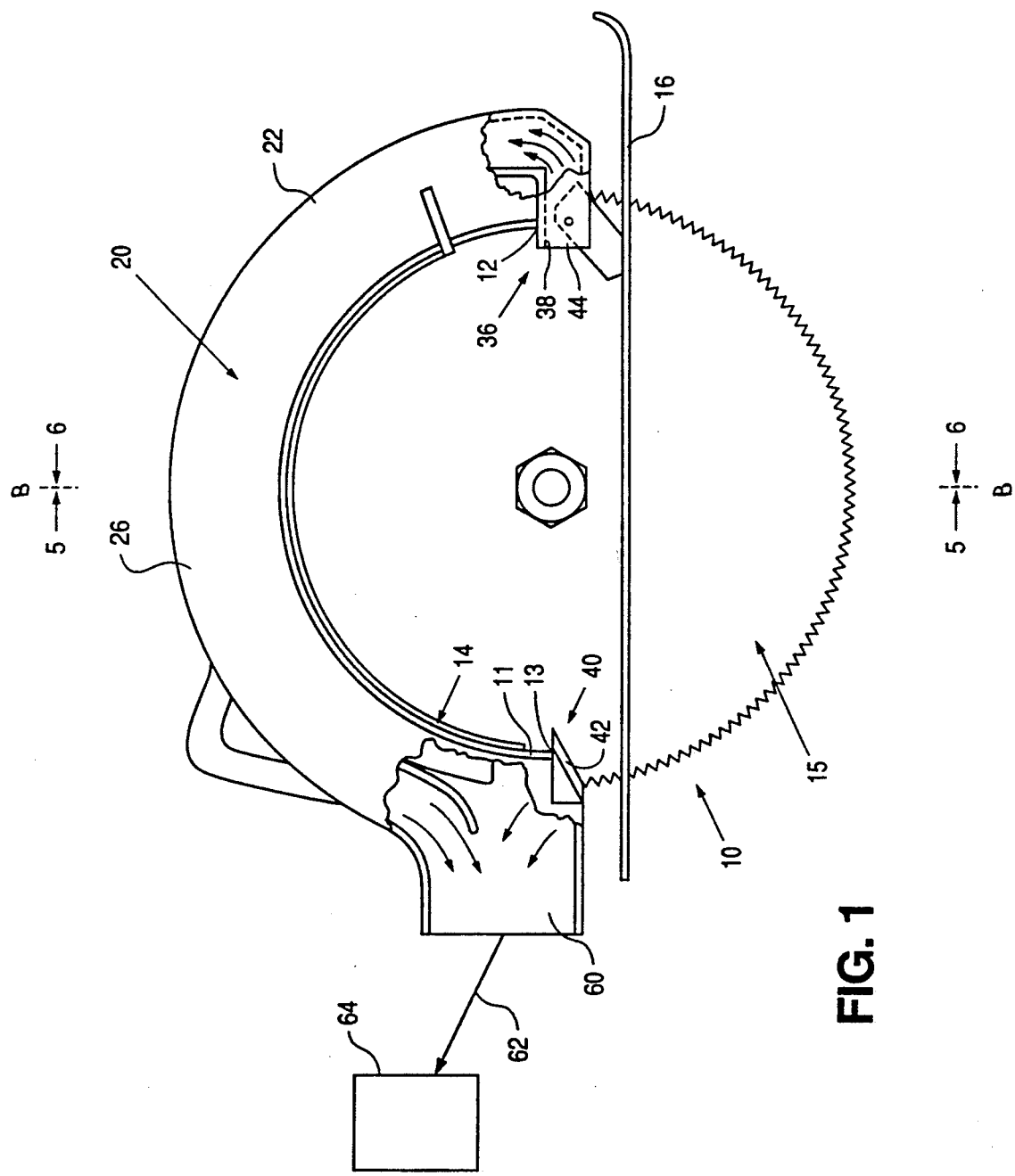
FIG. 1 is a side view of the dust collecting device of the present invention attached to a portable circular saw.

For the purposes of the promoting an understanding of the principals of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principals of the invention as illustrated therein being contemplated as would normally occur to one skilled in the art to which the invention relates.

Referring to FIG. 1 there is illustrated the device 20 for collecting dust from a portable circular saw 10. Portable circular saw 10 is of the type commonly used and available for use by consumers. Portable circular saw 10 has a fixed upper blade guard 11 with a front terminus 12 and a rear terminus 13 which define front and rear upper blade guard openings. A pivoting blade guard 14, which when the saw is not in use rotates down to cover the lower part of the blade 15, is also located on the saw 10. Also, the saw 10 has a base plate 16 which supports the saw on the surface of the work being cut. The fixed upper blade guard 11 has a top outer surface 17 (FIG. 5), an outside outer surface 18, and an inside outer surface 19.

The device 20 has a housing 22 (FIG. 1 and 2) with a lower surface 24 (FIGS. 3 and 4) which is generally shaped similar to the top surface 17 of the saw 10. Typically, the top surface 17 of a portable circular saw is curved convexly to accommodate the spinning saw blade located therein, and, thus, the lower surface 24 should be curved concavely so that the top surface 17 can be received snugly against it. The housing 22, however, is longer than the top surface 17 of the fixed blade guard 11 so that, when the device 20 is affixed to the saw 10, the housing 22 extends beyond the front 12 and rear terminus 13 of the fixed blade guard 11. Housing 22 has an outer surface 26 which contains a downwardly extending flange 28 (FIGS. 3, 4 and 5) that extends beyond the lower surface 24. This downwardly extending flange 28 has an inner surface 30 which with lower surface 24 define a fixed blade guard receiving channel 32. As is shown in the drawings, the lower surface 24 is curved to conform generally to the shape of the fixed upper blade guard 11 of the saw 10. Also, the downwardly extending flange 28, although described as downwardly extending, because of the way it appears in the cross sections of FIGS. 3, 4, 5 and 6, actually extends radially inward from the lower surface 24. Located in the receiving channel 32 are compressible blade guard engagement means 34 which are attached to the inner surface 30 and the lower surface 24. In the preferred embodiment, these compressible blade guard engagement means 34 are simply foam rubber and are designed to compress when forces are exerted to pull the inner surface 30 of the downwardly extending flange 28 into engagement with the outside outer surface 18 of fixed upper blade guard 11. Foam rubber is used for the compressible blade guard engagement means 34 because, when they come in contact with the fixed upper blade guard 11 and are compressed against the blade guard, they frictionally resist rotation of the device 20 about the blade guard.

Figure 5:
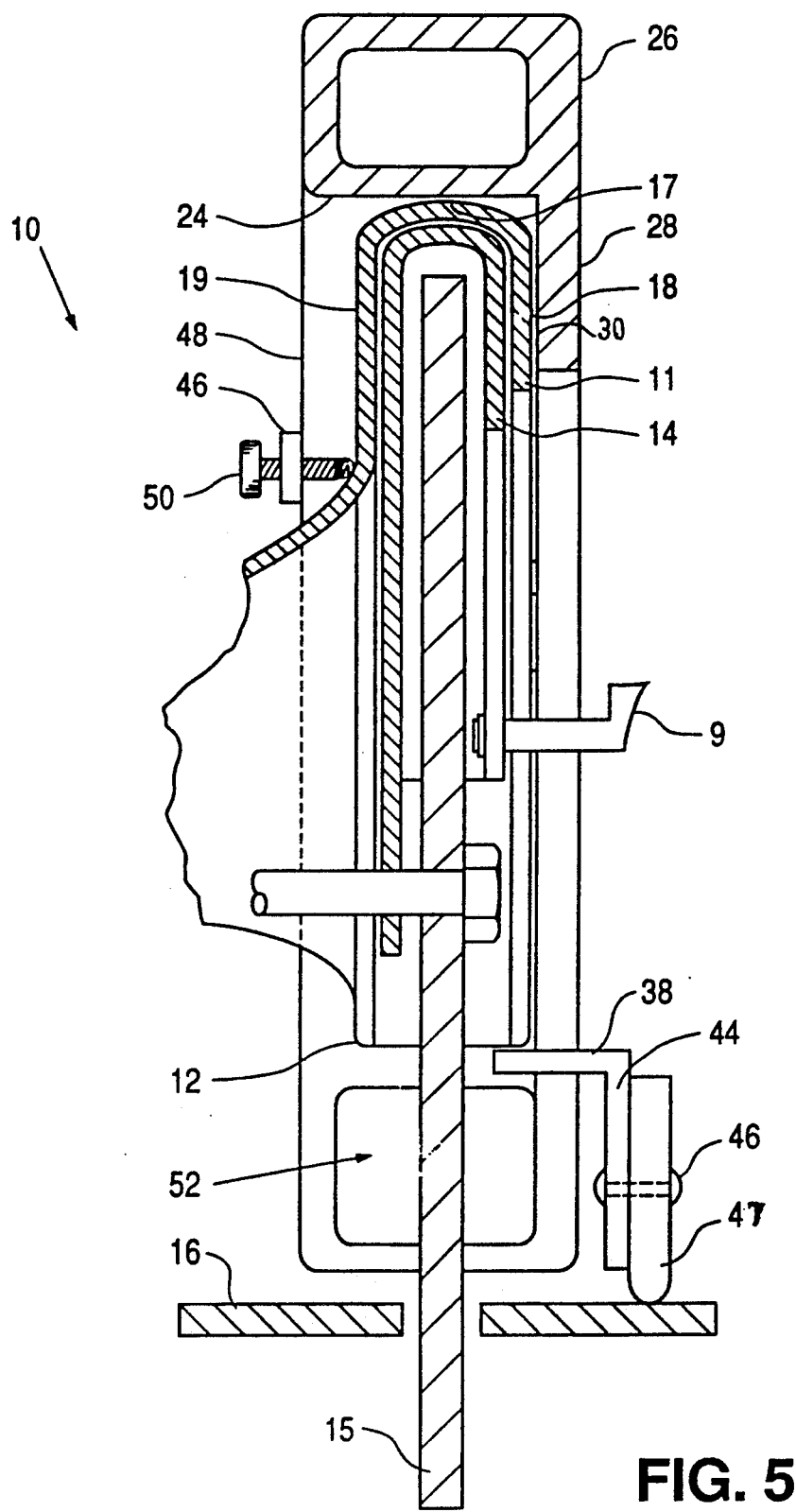
FIG. 5 is a cross-sectional view of the present invention illustrated in FIG. 1 along the line BB in the direction of arrows 5—5.
Figure 6:
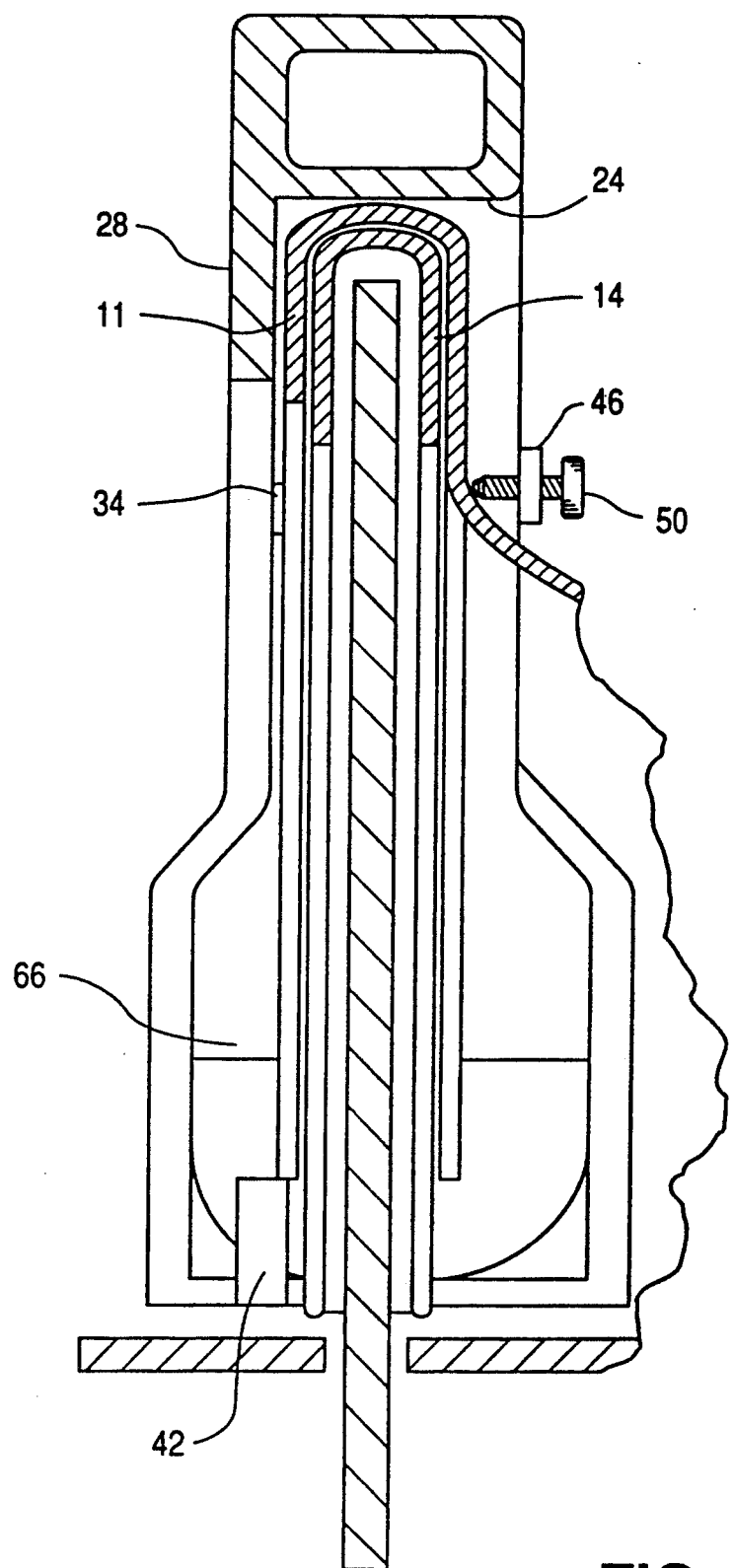
FIG. 6 is a cross-sectional view of the invention illustrated in FIG. 1 along line BB in the direction of arrows 6—6.

FIGS. 1, 5 and 6 illustrate additional structural components of the device 20 which prevent the device from rotating about the fixed upper blade guard 11. Near the front end 36 of the device 20, there is a rearwardly extending flange 38 which engages the front terminus 12 of the fixed upper blade guard 11. Near the rear end 40 of the device 20, there is a forwardly extending flange 42 which engages the rear terminus 13 of the fixed upper blade guard 11. Rearwardly extending flange 38 and forwardly extending flange 42 prevent the device 20 from rotating rearwardly or forwardly about the fixed upper blade guard 11. Therefore, forwardly extending flange 42 and rearwardly extending flange 38 act as anti-rotational means.

In examining FIGS. 1, 5 and 6, it is obvious that the device 20 does not extend so far beyond the fixed blade guard 11 that it comes in contact with the base plate 16. Therefore, there is an opening from which sawdust might escape. In order to close this opening, there is a downwardly extending lip 44 extending from the rearwardly extending flange 38. Pivotally mounted to the downwardly extending lip 44 by a rivet or the like 46 is a rotating guard 47 which when the device 20 is attached to the circular saw 10 rotates down to engage the base plate 16 and close part of the opening previously mentioned (see FIG. 5).

The device 20 is attached to the circular saw 10 by attachment means which pull the inner surface 30 of the downwardly extending flange 28 toward the outside outer surface 18 of the fixed upper blade guard 11 thereby compressing the compressible blade guard engagement means 34 (see FIGS. 5 and 6). In the preferred embodiment this is accomplished by providing inwardly extending protrusions 46 attached to the inner surface 48 (FIGS. 3, 4 and 5) of the housing 22 so that the inwardly extending protrusions 46 extend radially inwardly from the lower surface 24. A set screw 50 is threadingly engaged in the inwardly extending protrusion 46 and, when the device is fitted onto the fixed upper blade guard 11, the set screw 50 is tightened to engage the inner surface 19 of the fixed upper blade guard 11 and thereby compress the compressible blade guard engagement means 34 by pulling the downwardly extending flange 28 toward the outside outer surface 18 of the fixed upper blade guard 14. It is envisioned that the set screw 50 might be replaced with a wing nut or the like and still conform with the teaching of the present invention. Also, the inwardly extending protrusion 46 could be made of flexible material and be designed to frictionally engage the inner surface 19 of the fixed upper blade guard 11 and thereby provide for a snap type fit of the device 20 onto portable circular saw 10. These types of attachment means are all envisioned to be within the teaching of this invention.

Figure 2:
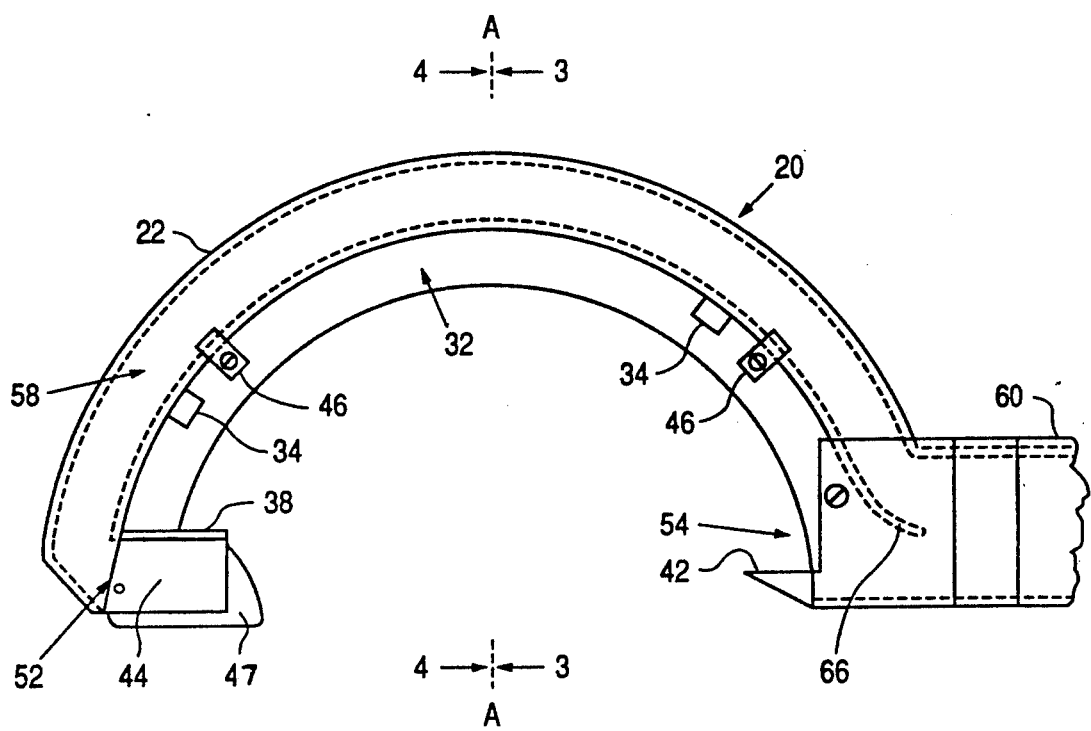
FIG. 2 is a side view of only the present invention from the opposite side as shown in FIG. 1.
Figure 3:
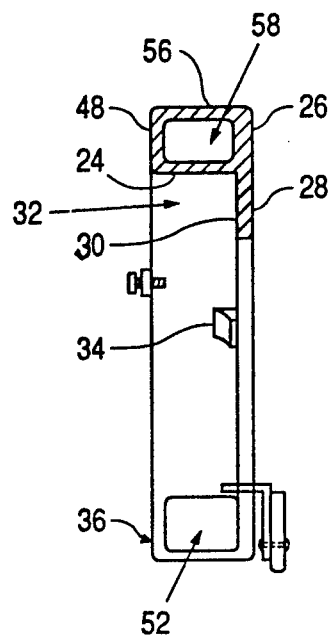
FIG. 3 is a cross-sectional view of the present invention along the line AA of FIG. 2 in the direction of arrows 3—3.
Figure 4:
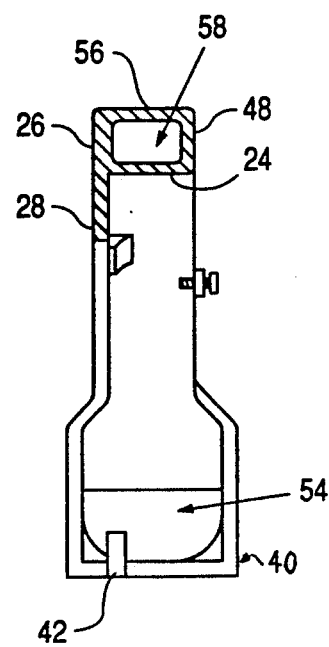
FIG. 4 is a cross-sectional view of the present invention illustrated in FIG. 2 along the line AA in the direction of arrows 4—4.

FIGS. 2, 3 and 4 best illustrate the structure of the present invention which is designed to provide vacuum collection of sawdust generated during sawing. A front vacuum aperture 52 is formed through the lower surface 24 near the front end 36 of the device 20. Likewise, a rear vacuum aperture 54 is formed through the lower surface 24 near the rear end 40 of the device 20. The lower surface 24, outer surface 26, inner surface 48, and top surface 56 are all the outward manifestations of thin walls which define a vacuum chamber 58 which extends from the rear end 40 to the front end 36 of the device. This vacuum chamber 58 provides fluid communication between the front vacuum aperture 52 and rear vacuum aperture 54. Attached to the rear end 40 of the housing 22 is a vacuum source connector 60 designed to be attached to a vacuum hose (shown schematically in FIG. 1 as 62) for connection to a vacuum source 64. Near the rear end 40 of the device 20, the lower surface 24 extends downwardly and backwardly into the vacuum source connector 60 to form a baffle 66 designed so that when a vacuum force is supplied by vacuum source 64 suction is provided at the rear vacuum aperture 54 and also at the front vacuum aperture 52 through a first and second branch of vacuum chamber 58. It is envisioned that adjustments to the location of the vacuum source connector 60 can be made and a flexible tube could be substituted for the integrally formed vacuum chamber 58 described herein and still come within the teachings of the invention.

FIGS. 1, 5 and 6 illustrate the device 20 when it is attached to a circular saw 10. From viewing these figures, it should be apparent that the fixed upper blade guard 11 is received in the fixed blade guard receiving channel 32 and then set screw 50, or similarly previously described attachment means, are tightened to provide frictional engagement between compressible blade guard engagement means 34 and the fixed upper blade guard 11. Rearwardly extending flange 38 and forwardly extending flange 42 engage the front terminus 12 and rear terminus 13 of the fixed blade guard to prevent rotation. When the device 20, illustrated in the drawings, is attached in this manner, the device 20 is so securely attached to the saw 10 that the saw 10 can be carried by grasping the device 20. A vacuum source 64 is then connected to the vacuum source connector 60 and a vacuum is provided. As the blade of a circular saw turns in a counterclockwise direction (as illustrated in FIG. 1) and material (not illustrated) is cut, sawdust is generated which is collected through the front vacuum aperture 52 and rear vacuum aperture 54. During the cutting operation, the pivoting blade guard 14 is pivoted forward and the device is arranged to allow for free pivoting of the blade guard and prevent any interference with the blade guard lever 9 which is typically attached to the pivoting blade guard. Near the rear end 40 of the device, the walls forming the inner surface 48, outer surface 26 and top surface 56 flair out as illustrated in FIG. 6 to provide for a larger rear aperture to better contain the dust from the rear upper blade guard opening in the fixed upper blade guard while allowing for fluid communication to the vacuum source connector.

The design illustrated and described herein allows the device 20 to be easily attached to and removed from existing power saws. Therefore, it is capable of being attached at any time when it might be beneficial to reduce the amount of sawdust generated during a sawing operation. Since the device 20 does not require the saw 10 to be permanently modified in any substantial manner, the device 20 can be easily attached and removed as the operator sees fit. Also, it should be understood from this description and the illustrations that the device 20 does not inhibit use of the saw in a remodeling type of environment where the materials to be cut are already affixed to the structure since the device 20 does not extend below the base plate 16.

While the invention has been illustrated and described in detail in the drawings and foregoing description, the same is to be considered illustrative and not restrictive in character, it being understood that only the preferred embodiment has been shown and described and that all changes and modifications that come within the spirit of the invention are desired to be protected.

What is claimed is:

1. A device for attachment to an existing portable circular saw with a fixed upper blade guard having a front and rear terminus a top surface, an inside outer surface, and an outside outer surface extending between a front upper blade guard opening and a rear upper blade guard opening respectively defined by the front and rear terminus of the fixed upper blade guard, comprising:

a housing having a lower surface and a downwardly extending flange extending below said lower surface from a first side of said housing, said downwardly extending flange having an inside surface which with said lower surface defines a receiving channel designed and arranged to receive the fixed upper blade guard therein with said housing extending beyond the rear terminus of the fixed upper blade guard to define a rear end, and said lower surface defining a rear vacuum aperture located near the rear blade guard opening when the fixed upper blade guard is received within said receiving channel;

a vacuum source connection means for connection to a vacuum source attached to said housing in fluid communication with said rear vacuum aperture;

removable attachment means affixed to said housing for removably attaching said housing to the fixed upper blade guard.

2. The device of claim 1 wherein said housing is designed and arranged to extend beyond the front terminus of the fixed upper blade guard to define a front end and said lower surface defines a front vacuum aperture located near the front blade guard opening when the fixed upper blade guard is received within said receiving channel and further comprising fluid connection means extending between and fluidly connecting said front vacuum aperture, said rear vacuum aperture and said vacuum source connection means.

3. The device of claim 2 wherein said removable attachment means comprise an inwardly extending protrusion attached to a second side of said housing opposite said first side and a pulling means attached to said inwardly extending protrusion for pulling said downwardly extending flange toward the outside outer surface of the fixed upper blade guard.

4. The device of claim 3 wherein said pulling means comprises a linear fastener threadingly attached to said inwardly extending protrusion and designed and arranged to contact said inside outer surface when said linear fastener is tightened.

5. The device of claim 4 and further comprising a rearwardly extending flange attached to said front end for engaging the front terminus of the fixed upper blade guard when such is received in said receiving channel.

6. The device of claim 5 and further comprising a forwardly extending flange attached to said rear end for engaging the rear terminus of the fixed upper blade guard when such is received in said receiving channel.

7. The device of claim 6 and further comprising compressible blade guard engagement means attached to said inside surface of said downwardly extending flange for engaging the inside outer surface of the fixed upper blade guard when such is received in said receiving channel and said pulling means has pulled the outside outer surface toward said downwardly extending flange.

8. The device of claim 1 wherein said receiving channel is shaped similar to the shape of the fixed upper blade guard and further comprising anti-rotational means for preventing rearward and forward rotation of said housing about the fixed upper blade guard when such is received in said receiving channel.

9. The device of claim 8 wherein said anti-rotational means comprises a forwardly extending flange attached to said rear end for engaging the rear terminus of the fixed upper blade guard when such is received in said receiving channel.

10. The device of claim 9 wherein said removable attachment means comprise an inwardly extending protrusion attached to a second side of said housing opposite said first side and a pulling means attached to said inwardly extending protrusion for pulling said downwardly extending flange toward the outside outer surface of the fixed upper blade guard.

11. The device of claim 8 wherein said housing is designed and arranged to extend beyond the front terminus of the fixed upper blade guard to define a front end and said lower surface defines a front vacuum aperture located near the front blade guard opening when the fixed upper blade guard is received within said receiving channel and further comprising fluid connection means extending between and fluidly connecting said front vacuum aperture, said rear vacuum aperture and said vacuum source connection means.

12. A device for attachment to an existing portable circular saw with a fixed upper blade guard having a front and rear terminus a top surface and an outside outer surface extending between a front upper blade guard opening defined by the front terminus of the fixed upper blade guard and a rear upper blade guard opening defined by the rear terminus of the fixed upper blade guard comprising:
- a housing having a concavely curved lower surface, a rear end and a front end;
- a flange attached to a first side of said housing and extending radially inward from said concavely curved lower surface, said flange having an inside surface which with said concavely curved lower surface defines a receiving channel designed and arranged to receive the fixed upper blade guard therein;
- a front vacuum aperture extending through the concavely curved lower surface;
- a vacuum source connection means attached to said housing for connection to a vacuum source;
- fluid communication means attached to said front vacuum aperture and said vacuum source connection means for providing fluid communication therebetween; and
- removable attachment means affixed to said housing for removably attaching said housing to the fixed upper blade guard wherein said front vacuum aperture is located near the front upper blade guard opening when the fixed upper blade guard is received in said receiving channel.

13. The device of claim 12 wherein said fluid communication means is integrally formed within said housing.

14. The device of claim 12 wherein said housing has a rear end and further comprising a rear vacuum aperture extending through the concavely curved lower surface near the rear end wherein said fluid communication means has a first branch providing fluid communication between said front vacuum aperture and said vacuum source connection means and a second branch extending between said rear vacuum aperture and said vacuum source connection means and wherein said rear vacuum aperture is located near the rear upper blade guard opening when the fixed upper blade guard is received in said receiving channel.

15. The device of claim 14 and further comprising anti-rotational means attached to said housing for preventing forward and rearward rotation of said housing about said fixed upper blade guard.

16. The device of claim 15 wherein said anti-rotational means comprises a rearwardly extending flange attached to said front end for engaging the front terminus of the fixed upper blade guard when such is received in said receiving channel and a forwardly extending flange attached to said rear end for engaging the rear terminus of the fixed upper blade guard when such is received in said receiving channel.

17. The device of claim 16 wherein said fluid communication means is integrally formed within said housing.

* * * * *